(12) United States Patent
Yang et al.

(10) Patent No.: US 9,473,933 B2
(45) Date of Patent: Oct. 18, 2016

(54) KEY ISOLATION METHOD AND DEVICE

(71) Applicant: China Academy of Telecommunications Technology, Beijing (CN)

(72) Inventors: Yi Yang, Beijing (CN); Jing Liang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 14/421,442

(22) PCT Filed: Sep. 10, 2013

(86) PCT No.: PCT/CN2013/083165
§ 371 (c)(1),
(2) Date: Feb. 13, 2015

(87) PCT Pub. No.: WO2014/040518
PCT Pub. Date: Mar. 20, 2014

(65) Prior Publication Data
US 2015/0223058 A1     Aug. 6, 2015

(30) Foreign Application Priority Data

Sep. 13, 2012  (CN) .......................... 2012 1 0338194

(51) Int. Cl.
*H04M 3/16*     (2006.01)
*H04W 12/04*    (2009.01)
(Continued)

(52) U.S. Cl.
CPC ......... *H04W 12/04* (2013.01); *H04W 36/0055* (2013.01); *H04W 36/0038* (2013.01); *H04W 36/04* (2013.01)

(58) Field of Classification Search
CPC ....................................................... H04W 12/04
USPC ........................................................... 455/411
See application file for complete search history.

(56) References Cited

U.S. PATENT DOCUMENTS

2008/0310368 A1* 12/2008 Fischer ................... H04L 47/10
370/331
(Continued)

FOREIGN PATENT DOCUMENTS

| CN | 101552983 A | 10/2009 |
| CN | 101931950 A | 12/2010 |

(Continued)

OTHER PUBLICATIONS

International Search Report for PCT/CN2013/083165.
(Continued)

*Primary Examiner* — Santiago Garcia
(74) *Attorney, Agent, or Firm* — Kilpatrick Townsend & Stockton LLP

(57) ABSTRACT

According to an embodiment of the present invention, after a macro base station judges to switch a user plane bearer of user equipment, according to a differentiating parameter of a target base station and a temporary key shared by the macro base station and the user equipment, the macro base station generates a key used for the communication between the target base station and the user equipment; and the macro base station sends the differentiating parameter to the user equipment so as to enable the user equipment to generate a key used for the communication between the user equipment and the target base station according to the differentiating parameter and the temporary key shared by the macro base station and the user equipment.

14 Claims, 6 Drawing Sheets

(51) Int. Cl.
*H04W 36/04* (2009.01)
*H04W 36/00* (2009.01)

(56) References Cited

U.S. PATENT DOCUMENTS

| | | | |
|---|---|---|---|
| 2009/0054063 A1* | 2/2009 | Roberts | H04W 24/00 455/434 |
| 2010/0267363 A1* | 10/2010 | Blom | H04J 11/0069 455/410 |
| 2011/0044455 A1* | 2/2011 | Huang | H04W 12/04 380/278 |
| 2011/0122843 A1* | 5/2011 | Iwamura | H04W 12/04 370/331 |
| 2012/0129537 A1* | 5/2012 | Liu | H04W 36/04 455/444 |
| 2012/0213346 A1* | 8/2012 | Gao | H04M 3/42017 379/93.01 |
| 2015/0139192 A1* | 5/2015 | Zhang | H04W 36/04 370/331 |
| 2015/0237540 A1* | 8/2015 | Van Lieshout | H04W 36/0055 455/436 |

FOREIGN PATENT DOCUMENTS

| | | |
|---|---|---|
| CN | 102056157 A | 5/2011 |
| CN | 102065424 A | 5/2011 |
| WO | 2011/054286 A1 | 5/2011 |
| WO | 2011100492 A1 | 8/2011 |
| WO | 2011/137805 A1 | 11/2011 |

OTHER PUBLICATIONS

CATT: "Security Challenges of Potential Solutions; R2-130981", 3rd Generation Partnership Project (3GPP) Draft, Apr. 5, 2013, XP050699194, Retrieved from the Internet: URL:http://www.3gpp.org/ftp/tsg_ran/WG2_RL2/TSGR2_81bi s/Docs/ [retrieved on Apr. 5, 2013].

The Extended European Search Report issued on Dec. 14, 2015 in the EP counterpart application (13836407.0).

'Security architecture (Release 9) 3GPP TS 33.401', 3rd Generation Partnership Project (3GPP) Standard, Dec. 28, 2010 pp. 1-105, XP050462460, [retrieved on Dec. 28, 2010].

The Partial Supplementary European Search Report issued on Sep. 28, 2015 in the EP counterpart application (13836407.0).

Office Action for CN 201210338194.7 issued Mar. 4, 2016, 7 pages.

* cited by examiner

KEY ISOLATION METHOD AND DEVICE

This application is a US National Stage of International Application No. PCT/CN2013/083165, filed on Sep. 10, 2013, designating the United States and claiming the priority of Chinese Patent Application No. 201210338194.7, filed with the Chinese Patent Office on Sep. 13, 2012, the content of which is hereby incorporated by reference in its entirety.

FIELD

The present disclosure relates to the field of wireless communications and particularly to a key isolation method and device.

BACKGROUND

Along with a constantly growing rate and capacity of data traffic, layered network deployment has been introduced for a higher data rate, an extended network capacity and a lower traffic cost. With the layered network deployment, there is provided a low-power local evolved Node B (eNB) in addition to a macro eNB. The local eNB with a small coverage area is embodied in the femto/pico/relay form.

Since the coverage area of the local eNB is so small that a User Equipment (UE) is handed over at a much higher frequency and for a much larger number of times, a network deployment scheme with separation of the user plane from the control plane has been introduced for a lower frequency at which the UE is handed over between a macro cell hosted by the macro eNB and a small cell hosted by the local eNB. As illustrated in FIG. 1, there is underlying coverage by the macro cell and hotspot coverage by the small cell, and a data/signaling interface (a wired/wireless interface) is present between the small cell and the macro cell. When the UE connected with the macro eNB comes close to the cell controlled by the local eNB, the user plane can be handed over to the local eNB for a higher quality of service available from the local eNB; and when the UE goes far way from the cell controlled by the local eNB, the user plane needs to be handed over to the cell controlled by the macro eNB to maintain the wireless connection.

In the network architecture above with bearer separation, when the UE resides in the area covered only by the macro cell, both control plane connections of the UE and user plane connections, i.e., Data Radio Bearers (DRBs), are served by the macro eNB; and when the UE moves to the area covered by both the macro cell and the small cell, all or a part of the user plane connections of the UE are handed over to the local eNB for a higher traffic transmission rate while the control plane connections are still maintained with the macro eNB to thereby prevent a call of the UE from being dropped due to a failure to handed over the control plane connections.

SUMMARY

Embodiments of the disclosure provide a key isolation method and device so as to perform key isolation between base stations in a network with bearer separation to thereby secure communication of a UE.

An embodiment of the disclosure provides a key isolation method including:

generating, by a macro base station, a key for use in communication of a destination base station with a User Equipment (UE) from a distinguishing parameter of the destination base station and a temporary key shared by the macro base station with the UE, upon deciding user plane bearers of the UE to be handed over; and transmitting, by the macro base station, the distinguishing parameter to the UE so that the UE generates the key for use in communication of the UE with the destination base station from the distinguishing parameter, and the temporary key shared by the UE with the macro base station.

An embodiment of the disclosure provides a macro base station device including a handover deciding module, a key managing module, a key generating module and a first transmitting module, wherein:

the handover deciding module is configured to make a user plane bearer handover decision on a UE;

the key managing module is configured to transmit an instruction to the key generating module to generate a key, and an instruction to the first transmitting module to transmit a distinguishing parameter, when the handover deciding module decides user plane bearers of the UE to be handed over;

the key generating module is configured to generate the key for use in communication of a destination base station with the UE from the distinguishing parameter of the destination base station and a temporary key shared by the macro base station with the UE in response to the instruction of the key managing module; and the first transmitting module is configured to transmit the distinguishing parameter to the UE in response to the instruction of the key managing module so that the UE generates the key for use in communication of the UE with the destination base station from the distinguishing parameter, and the temporary key shared by the UE with the macro base station.

With the embodiments of the disclosure, when the user plane bearers of the UE are handed over between the base stations, the macro base station generates an air interface session key for the destination base station using a parameter of the destination base station which is distinguished from that of other base stations to ensure that air interface session keys generated by the macro base station respectively for the different base stations are different from each other, thereby achieving isolation between the base stations.

DETAILED DESCRIPTION OF THE EMBODIMENTS

Figure 1:
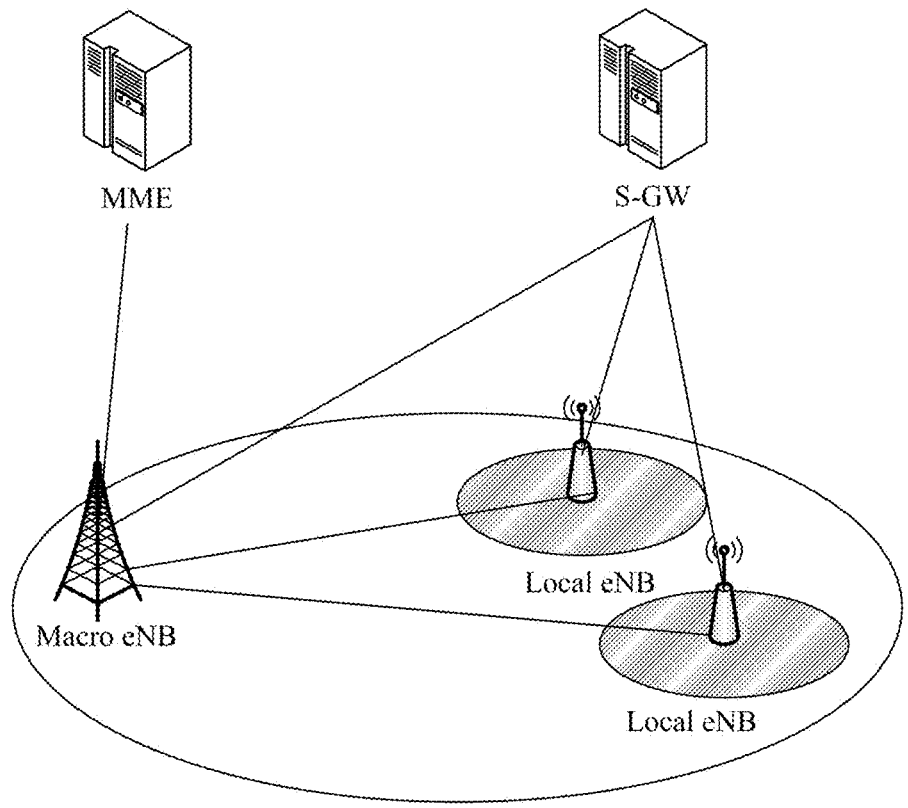
FIG. 1 illustrates a schematic architectural diagram of a network with separation of the user plane from the control plane.
Figure 2:
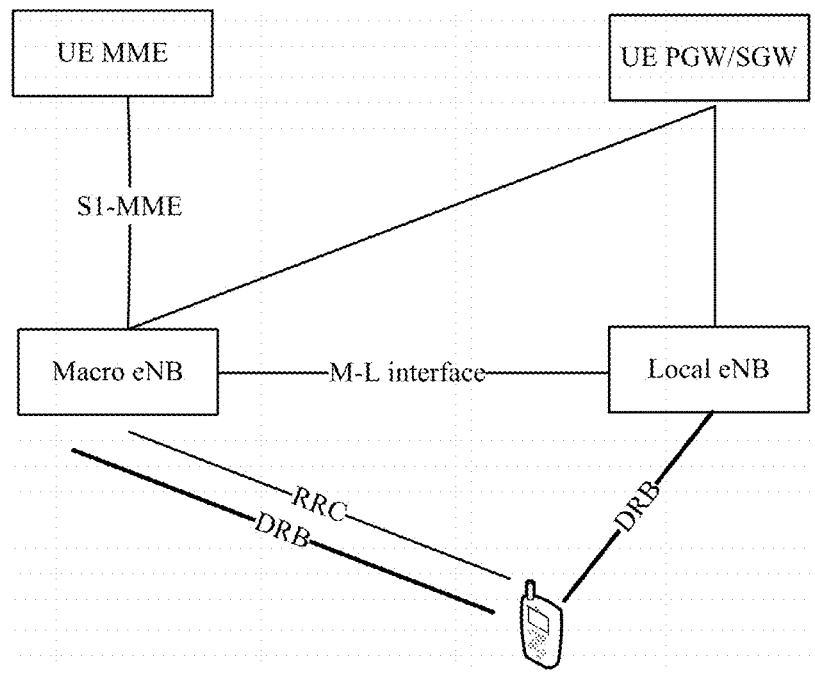
FIG. 2 illustrates a schematic diagram of an interface relationship in an architecture with separation of the user plane from the control plane.

FIG. 2 illustrates a network architecture with separation of the control plane from the user plane, where a UE is connected concurrently with two eNBs. As illustrated, the M-L interface represents a logical interface between the macro eNB and the local eNB, which can be predefined or can be an already standardized X2 interface. Signaling Radio Bearers (SRBs) of the UE are maintained on the macro eNB, and Packet Data Convergence Protocol (PDCP)/Radio Link Control (RLC)/Media Access Control (MAC)/Physical layer (PHY) components of all or a part of DRBs are maintained on the local eNB. Uplink data of the UE arriving at the local eNB is transmitted directly to a Serving Gateway (SGW), and downlink data of the UE arriving at the SGW is transmitted directly to the local eNB, thus alleviating a processing burden of data packets of the UE on the macro eNB.

Figure 3:
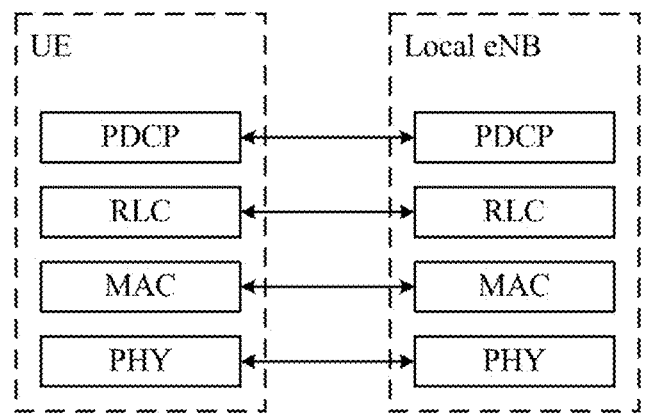
FIG. 3 illustrates a schematic diagram of a user plane protocol stack of a local eNB in an architecture with separation of the user plane from the control plane.

In the architecture illustrated in FIG. 2, the local eNB is provided with the entire user plane protocol stack, and FIG. 3 illustrates the user plane protocol stack between the UE and the local eNB.

Figure 4:
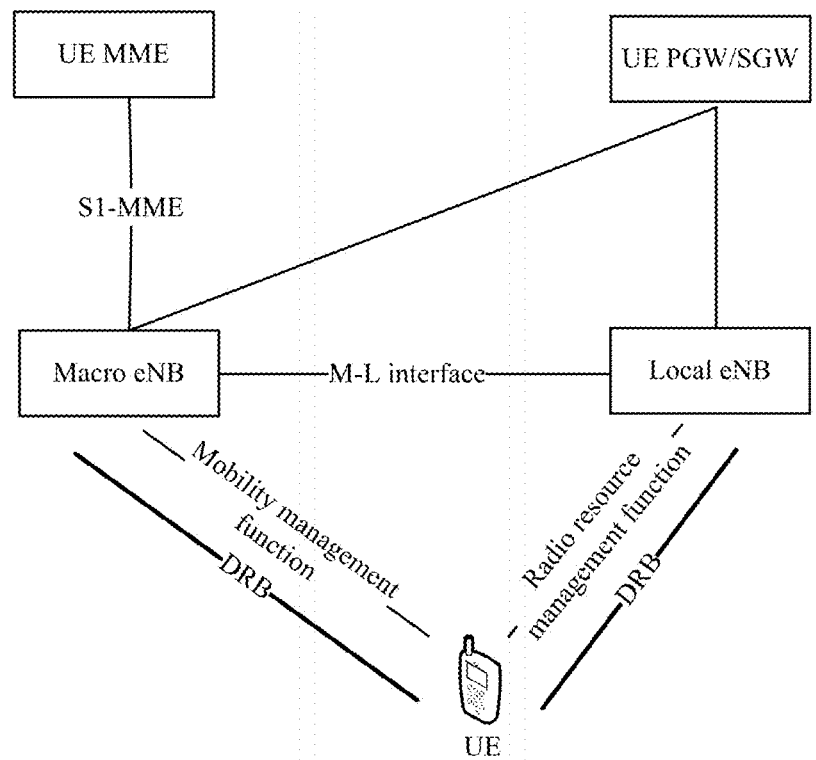
FIG. 4 illustrates a schematic diagram of an interface relationship in an alternative architecture with separation of the user plane from the control plane.
Figure 5:
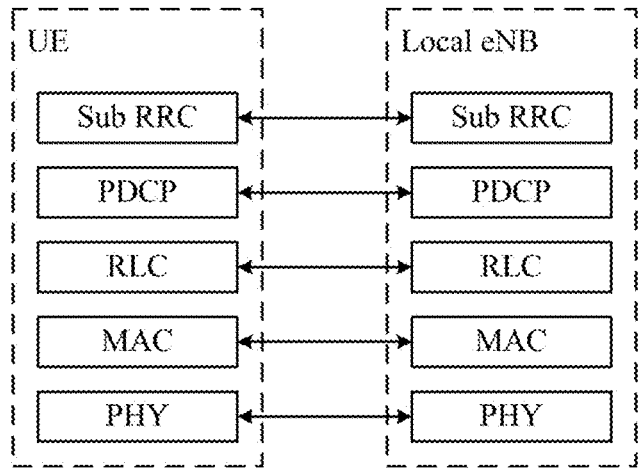
FIG. 5 illustrates a schematic diagram of a control plane protocol stack of a local eNB in the architecture with separation of the user plane from the control plane.

FIG. 4 illustrates a schematic diagram of an interface relationship in an alternative architecture with separation of the user plane from the control plane, where the macro eNB is provided with the entire user plane and control plane protocol stacks. The user plane protocol stack between the macro eNB and the UE is as illustrated in FIG. 3. The local eNB is provided with the entire user plane protocol stack and a part of the Radio Resource Control (RRC) protocol function. The user plane protocol stack of the local eNB is also as illustrated in FIG. 3, and the control plane protocol stack thereof is as illustrated in FIG. 5, where the "sub-RRC layer" represents a protocol stack with only a part of RRC functions, e.g., only the radio resource management function.

In the two network architectures with separation of the control plane from the user plane illustrated in FIG. 2 and FIG. 4, there is a PDCP layer on the local eNB, so the local eNB needs to be provided with an encryption key of the UE. In the architecture illustrated in FIG. 4, the local eNB further needs to be provided with an integrity key for integrity protection on an RRC message.

If a number of local eNBs are deployed in a coverage area of a macro eNB and there may be an area covered by more than one of the local eNBs, then the UE may be handed over between the local eNBs or between the macro eNB and one of the local eNBs. The local eNB which is an unsecured access network node may be cracked by a hacker. If the UE connected with some local eNB is also connected with another eNB, e.g., the macro eNB or another local eNB, then in order to prevent an influence of the cracked some local eNB on secured communication of the UE with the other eNB, key isolation needs to be performed between the local eNBs and between the macro eNB and the local eNB.

Figure 6:
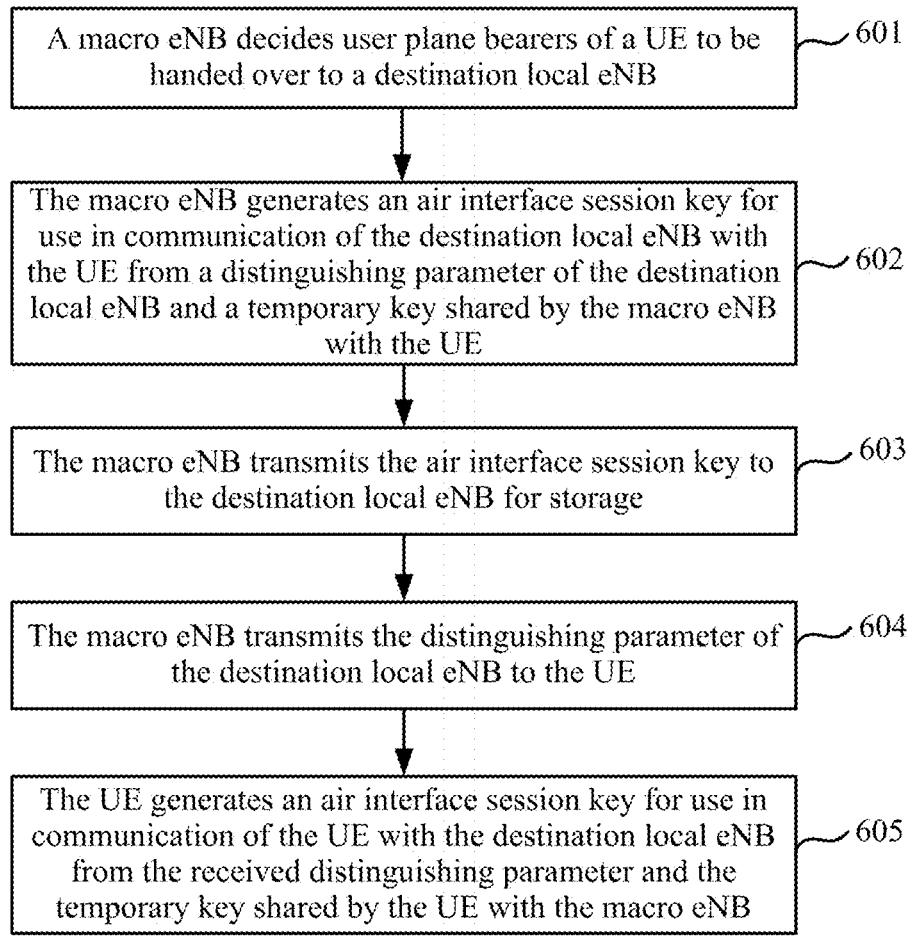
FIG. 6 illustrates a schematic flow chart of a key isolation method according to an embodiment of the disclosure.

FIG. 6 illustrates a schematic flow chart of a key isolation method according to an embodiment of the disclosure, and as illustrated, the flow can include the following operations:

Operation 601. A macro eNB makes a user plane bearer handover decision from a measurement report transmitted by a UE, where a result of the decision is to hand over user plane bearers of the UE to a destination local eNB.

Operation 602. The macro eNB generates a key for use in communication of the destination local eNB with the UE, i.e., an air interface session key, from a distinguishing parameter of the destination local eNB and a temporary key shared by the macro eNB with the UE (also referred to as an intermediate key).

In an embodiment of the disclosure, there are different distinguishing parameters of different local eNBs, so the distinguishing parameter of the destination local eNB can distinguish the destination local eNB from the other eNBs.

The temporary key can be a KeNB (Key of eNB) or a Next Hop (NH) key.

Operation 603. The macro eNB transmits the air interface session key generated in the operation 602 to the destination local eNB for storage.

In an embodiment of the disclosure, the macro eNB can transmit the air interface session key to the destination local eNB in a user plane handover request message or can transmit the air interface session key to the destination local eNB in a message predefined according to an embodiment of the disclosure.

Operation 604. The macro eNB transmits the distinguishing parameter of the destination local eNB to the UE.

In an embodiment of the disclosure, the macro eNB can transmit the distinguishing parameter to the UE in a user plane handover command.

Operation 605. The UE generates the key for use in communication of the UE with the destination local eNB, i.e., the air interface session key, from the received distinguishing parameter and the temporary key shared by the UE with the macro eNB.

Subsequently the UE can communicate with the destination local eNB by encrypting transmitted data using the air interface session key with the local eNB. The macro eNB can generate the air interface session key for the destination local eNB using the distinguishing parameter of the destination local eNB to ensure that air interface session keys generated by the macro eNB respectively for the different local eNBs are different from each other, thereby achieving key isolation between the eNBs.

In an embodiment of the disclosure, the flow above can be applicable to a handover of the user plane bearers of the UE from the macro eNB to the local eNB or a handover of the user plane bearers of the UE from a local eNB in a coverage area of the macro eNB to another local eNB.

If the macro eNB decides the user plane bearers of the UE to be handed over from the local eNB to the macro eNB in the operation 601, then the air interface key generated by the macro eNB in the operation 602 is an air interface session key between the macro eNB and the UE and may not be transmitted to the local eNB, that is, the operation 603 may be skipped. The air interface session key generated by the UE in the operation 604 may be used for communication of the UE with the macro eNB. In this case, the macro eNB can generate the air interface session key using a distinguishing parameter of the macro eNB to distinguish the macro eNB from the other eNBs, e.g., another macro eNB or local eNB, to ensure that the air interface session key generated by the macro eNB, the air interface session key generated for another eNB served by the macro eNB and the air interface session key generated by another macro eNB are different from each other, thereby achieving key isolation between the eNBs.

An embodiment of the disclosure will be described below in connection with particular handover scenarios.

Figure 7:
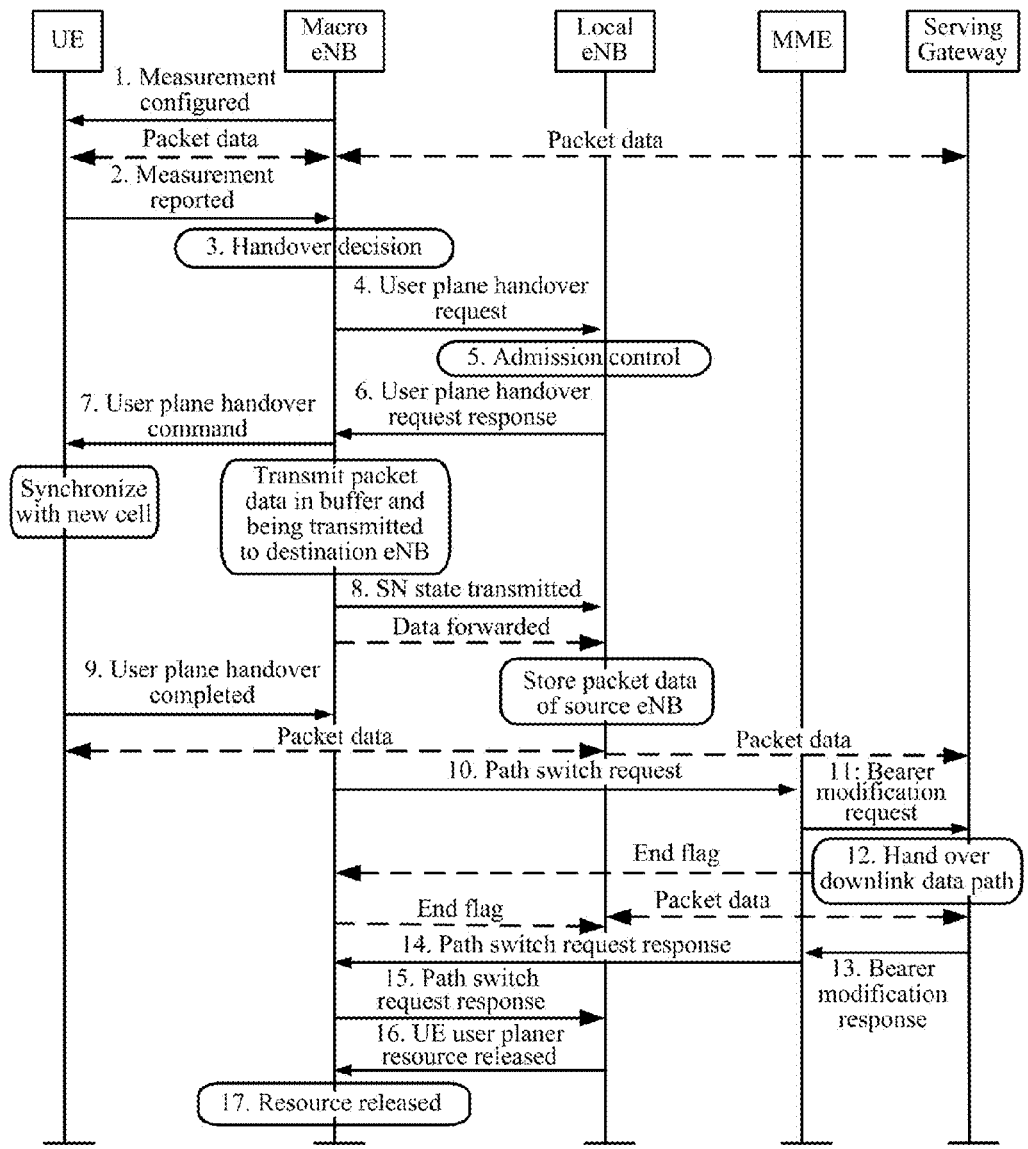
FIG. 7 illustrates a schematic flow chart of a key isolation method according to an embodiment of the disclosure.

According to an embodiment of the disclosure, a part or all of the user plane bearers of the UE can be handed over from the macro eNB to the local eNB. As illustrated in FIG. 7, a possible UE handover flow includes the following operations 1 to 16.

Operations 1 and 2. The macro eNB configures the UE to make measurement, and subsequently the UE makes measurement according to received measurement configuration information. The UE reports a measurement result over an uplink resource allocated by the macro eNB for the UE to assist the macro eNB in making a user plane handover decision.

Operation 3. The macro eNB makes a user plane handover decision. If the macro eNB decides user plane bearers of the UE to be handed over from the macro eNB to the destination local eNB, then the macro eNB generates a random number and calculates an encryption key from a temporary key and the random number in an encryption algorithm, where the temporary key can be a KeNB or a latest NH.

Operation 4. The macro eNB transmits to the destination local eNB a user plane handover request message including the encryption key calculated by the macro eNB in addition to handover preparation related information.

The macro eNB can alternatively transmit the generated encryption key to the destination local eNB in a separate key notification procedure (not illustrated in FIG. 7) instead of transmitting it to the destination local eNB by carrying it in the user plane handover request message.

According to an embodiment of the disclosure, in this operation, the macro eNB can further transmit to the destination local eNB a user plane handover request message including the temporary key, the random number, and information indicating the encryption algorithm, required for calculation of the encryption key in addition to the handover preparation related information.

The macro eNB can alternatively transmit the temporary key, the random number, and the information indicating the encryption algorithm, required for calculation of the encryption key to the destination local eNB in a separate encryption notification procedure (not illustrated in FIG. 7) instead of transmitting them to the destination local eNB in the user plane handover request message.

Operation 5. The destination local eNB makes an admission decision from Quality of Service (QoS) information of the bearers to be admitted by referring to the message and makes underlying configuration to prepare for the handover in the event that the UE is allowed to be admitted.

The destination local eNB further configures a local PDCP entity, corresponding to the bearers of the UE, with the encryption key for use in encryption of bearer data between the destination local eNB and the UE after the user plane bearers of the UE are handed over successfully.

If the destination local eNB receives the temporary key, the random number, and the information indicating the encryption algorithm, required for calculation of the encryption key from the macro eNB, then the destination local eNB calculates the encryption key from the temporary key and the random number in the indicated encryption algorithm.

Operation 6. The destination local eNB returns to the macro eNB a user plane handover request response message including an RRC container particularly containing the user plane handover command to trigger the UE to hand over the user plane bearers.

Operation 7. The macro eNB transmits the received user plane handover command to the UE after adding to the user plane handover command the random number used in the operation 3 and a parameter Next-hop Chaining Counter (NCC) indicating whether an NH needs to be calculated. The UE stops data from being transmitted and received with the macro eNB upon reception of the user plane handover command.

Operation 8. The macro eNB transmits sequence number state information of ongoing data transmission to the destination local eNB, e.g., the sequence number (SN) of a downlink data packet transmitted unsuccessfully, the first sequence number allocable by the destination local eNB, etc.

Operation 9. The UE calculates an encryption key from the random number in the user plane handover command and its own stored KeNB in its own stored encryption algorithm upon reception of the user plane handover command. If the NCC in the user plane handover command indicates that an NH needs to be used, then the UE calculates the encryption key from the random number and the NH in the user plane handover command in the encryption algorithm therein, where the encryption algorithm used at the UE side is the same as the encryption algorithm used by the macro eNB. Thereafter the UE configures a PDCP entity with the calculated encryption key for use and then returns a handover completion message to the macro eNB.

The UE further needs to recreate the PDCP/RLC/MAC layers due to the changed encryption key of the UE.

Key isolation has been performed in the flow above, and the following flow is a conventional flow of a handover procedure, which is substantially similar to a handover flow in the prior art, as briefed below.

Operation 10. The macro eNB initiates to an MME a path switch request carrying user plane transport layer addresses and downlink GPRS Tunnel Protocol (GTP) tunnel identifiers allocated by the local eNB for the respective UE Evolved Packet System (EPS) bearers.

Operation 11. The MME requests an SGW for modifying the bearers by notifying the SGW of the downlink user plane transport layer addresses and GTP tunnel identifiers, allocated for the respective UE EPS bearers, transmitted by the macro eNB.

Operation 12. The SGW performs path switching by handing over a downlink data transmission path of the UE to the destination local eNB.

Operation 13. The SGW returns to the MME a bearer modification response carrying the user plane transport layer addresses and uplink GTP tunnel identifiers allocated by the SGW respectively for the respective UE EPS bearers.

Operations 14 and 15. The MME returns to the macro eNB a path switch request response carrying the uplink user plane transport layer addresses and GTP tunnel identifiers allocated by the SGW respectively for the respective UE EPS bearers; and the macro eNB returns a path switch request response to the destination local eNB.

Operation 16. The destination local eNB transmits a UE context release request to the macro eNB.

Operation 17. The macro eNB releases the related resource allocated for handing over the UE.

According to an embodiment of the disclosure, the UE can return the random number received from the macro eNB to the macro eNB in the handover completion message in the operation 9. The macro eNB can compare the random number carried in the handover completion message with the random number used in the operation 3, and if the random number carried in the handover completion message is the same as the random number used in the operation 3, then the random number is determined not to have been altered; if the random number carried in the handover completion message is not the same as the random number used in the operation 3, then the random number is determined to have been altered. In order to secure communication, if the macro eNB determines the random number to have been altered, then the RRC layer can be instructed to release RRC connection with the UE.

According to an embodiment of the disclosure, when the local eNB is provided with a part of RRC functions, for example, when the local eNB is architectured as illustrated in FIG. 4, the random number above is also used by the macro eNB and the UE to calculate an integrity protection key to protect an RRC message. The integrity protection key is transmitted by the macro eNB to the destination local eNB.

According to an embodiment of the disclosure, when the macro eNB hands over only a part of the user plane bearers to the destination local eNB and maintain the other part of the user plane bearers at the macro eNB, the macro eNB and the UE can alternatively recalculate an air interface session key between the macro eNB and the UE, for example, including the encryption key, and the integrity protection key of the RRC message. The macro eNB and the UE can generate the air interface session key as in the prior art or as described in an embodiment of the disclosure above. If the air interface session key is generated as in the prior art, then the macro eNB and the destination local eNB may use different air interface session keys, or if the air interface session key is generated as described in an embodiment of the disclosure above, then the macro eNB and the destination local eNB may use the same air interface session key. As with the prior art, the encryption key, and the integrity protection key of the RRC message can be calculated from the KeNB or the NH in the encryption algorithm. As with an embodiment of the disclosure, the encryption key, and the integrity protection key of the RRC message can be calculated from the KeNB, or the NH and the random number, in the encryption algorithm.

In an embodiment of the disclosure, the encryption algorithm can be the Advanced Encryption Standard (AES), Snow 3G, ZUC (Zu Chongzhi) algorithm, etc.

In an embodiment of the disclosure, the random number generated by the macro eNB can be replaced with other information capable of distinguishing uniquely the local eNB, e.g., a global base station identifier, a combination of a Physical Cell Identifier (PCI) and a frequency, etc.

Figure 8:
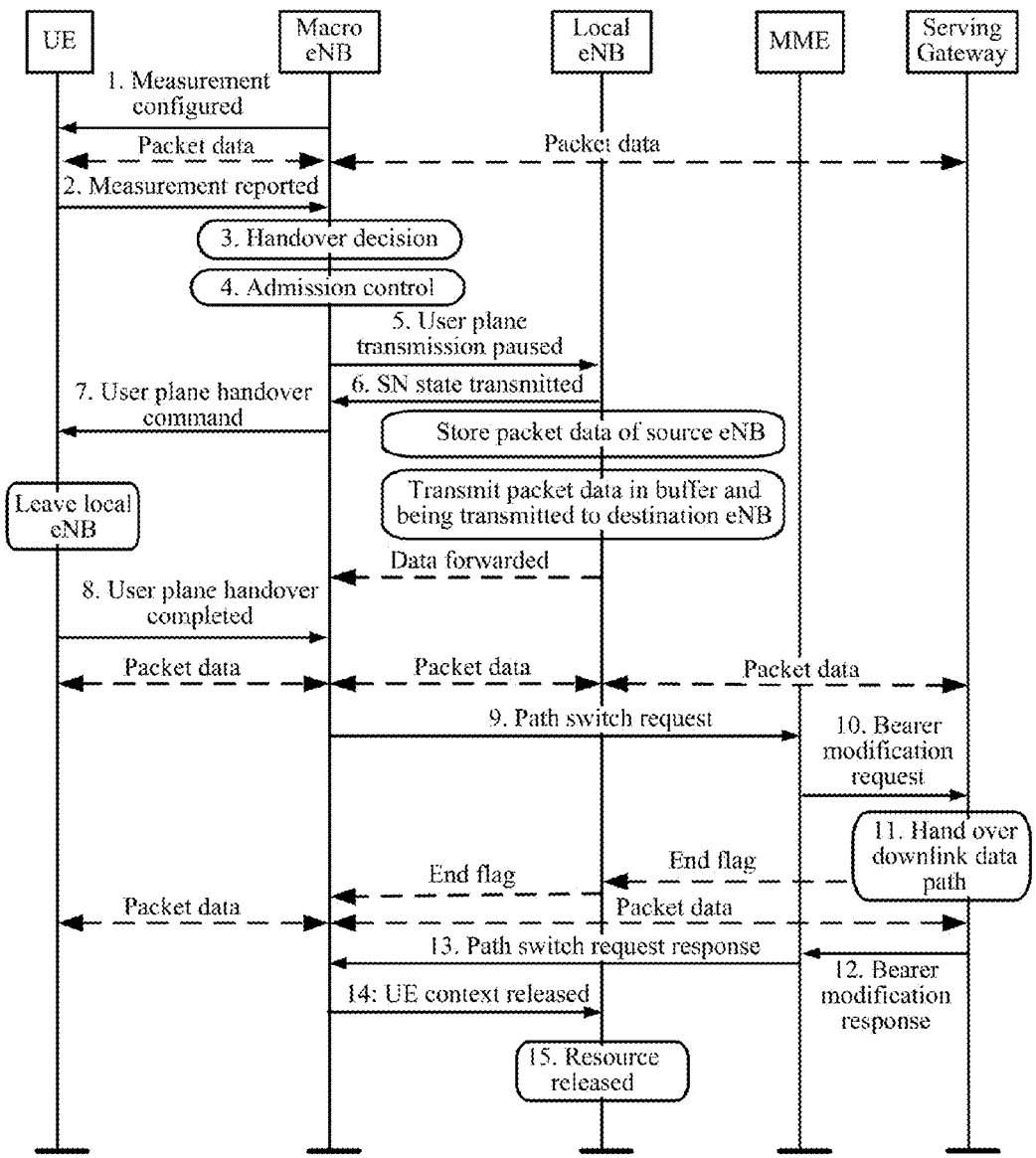
FIG. 8 illustrates a schematic flow chart of a key isolation method according to an embodiment of the disclosure.

According to an embodiment of the disclosure, all of the user plane bearers of the UE can be handed over from the local eNB to the macro eNB. As illustrated in FIG. 8, a possible UE handover flow includes the following operations 1 to 15.

Operations 1 and 2. The macro eNB configures the UE to make measurement, and subsequently the UE makes measurement according to received measurement configuration information; and the UE reports a measurement result over an uplink resource allocated by the macro eNB for the UE to assist the macro eNB in making a user plane handover decision.

Operation 3. The macro eNB makes a user plane handover decision. If the macro eNB decides user plane bearers the UE maintained with the local eNB to be handed over to the macro eNB, then the macro eNB generates a random number and calculates an encryption key from a KeNB, or a latest NH (if any), and the random number in an encryption algorithm.

The macro eNB configures a local PDCP entity, corresponding to the bearers of the UE, with the encryption key for use in encryption of bearer data between the macro eNB and the UE after the user plane of the UE is handed over.

Operation 4. The macro eNB makes an admission decision from QoS information of the bearers to be admitted and makes underlying configuration to prepare for the handover in the event that the UE is allowed to be admitted.

Operation 5-6. The macro eNB transmits a user plane transmission pause message to the local eNB, and the local eNB stops transmitting data to the UE in response to the message and returns sequence number state information of ongoing data transmission to the macro eNB.

Operation 7. The macro eNB transmits to the UE a user plane handover command including the random number used in the operation 3 and a parameter NCC indicating whether an NH needs to be calculated. The UE stops data from being transmitted and received with the source local eNB upon reception of the user plane handover command.

Operation 8. The UE calculates an encryption key from the random number in the user plane handover command and its own stored KeNB in its own stored encryption algorithm upon reception of the user plane handover command. If the NCC in the user plane handover command indicates that an NH needs to be used, then the UE calculates the encryption key from the random number and the NH in the user plane handover command in the encryption algorithm therein, where the encryption algorithm used at the UE side is the same as the encryption algorithm used by the macro eNB. Thereafter the UE configures a PDCP entity with the calculated encryption key for use and then returns a handover completion message to the macro eNB.

The UE further needs to recreate the PDCP/RLC/MAC layers due to the changed encryption key of the UE.

Key isolation has been performed in the flow above, and the following flow is a conventional flow of a handover procedure, which is substantially similar to a handover flow in the prior art, as briefed below.

Operation 9. The macro eNB initiates to an MME a path switch request carrying downlink user plane transport layer addresses and GTP tunnel identifiers allocated by the macro eNB for the respective UE Evolved Packet System (EPS) bearers.

Operation 10. The MME requests an SGW for modifying the bearers by notifying the SGW of the downlink user plane transport layer addresses and GTP tunnel identifiers allocated by the macro eNB for the respective UE EPS bearers.

Operation 11. The SGW performs path switching by handing over a downlink data transmission path of the UE to the macro eNB.

Operation 12. The SGW returns to the MME a bearer modification response carrying the uplink user plane transport layer addresses and GTP tunnel identifiers allocated by the SGW respectively for the respective UE EPS bearers.

Operation 13. The MME returns to the macro eNB a path switch response carrying the uplink user plane transport layer addresses and GTP tunnel identifiers allocated by the SGW respectively for the respective UE EPS bearers, and a new key NH and a counter NCC corresponding thereto.

Operation 14. The macro eNB transmits a UE context release request to the source local eNB.

Operation 15. The source local eNB releases the related resource allocated for handing over the UE in response to the request.

According to an embodiment of the disclosure, the UE can return the random number received from the macro eNB to the macro eNB in the handover completion message in the operation 8. The macro eNB can compare the random number carried in the handover completion message with the random number used in the operation 3, and if the random number carried in the handover completion message is the same as the random number used in the operation 3, then the random number is determined not to have been altered; if the random number carried in the handover completion message is not the same as the random number used in the operation 3, then the random number is determined to have been altered. In order to secure communication, if the macro eNB determines the random number to have been altered, then the RRC layer can be instructed to release RRC connection with the UE.

According to an embodiment of the disclosure, when the source local eNB is provided with a part of RRC functions before the handover, for example, when the source local eNB is architectured as illustrated in FIG. 4, the macro eNB needs to hand over this part of control plane bearers to the macro eNB, and the random number above is also used by the macro eNB and the UE to calculate an integrity protection key to protect an RRC message.

In an embodiment of the disclosure, the random number generated by the macro eNB can be replaced with other information capable of distinguishing uniquely the macro eNB, e.g., a global base station identifier, a combination of a Physical Cell Identifier (PCI) and a frequency, etc.

According to an embodiment of the disclosure, the user plane bearers of the UE are handed over from a local eNB served by the macro eNB to another local eNB in a similar handover flow to the flow in which the UE is handed over from the macro eNB to the local eNB in the first embodiment except that additionally the macro eNB needs to instruct the source local eNB to stop user plane data from being forwarded and to delete the key related to the UE.

It shall be noted that in the respective embodiments above, the macro eNB generates the air interface session key primarily from the distinguishing parameter of the destination eNB, e.g., the random number generated by the macro eNB, and the temporary key shared by the UE with the network side (the KeNB or the NH), so this has been exemplified in the respective embodiments above, although other additional parameters can be involved in calculation of the air interface session key in a particular implementation.

An embodiment of the disclosure further provides a base station device applicable to a network with bearer separation, e.g., a base station device applicable to a network with separation of the control plane from the user plane.

Figure 9:
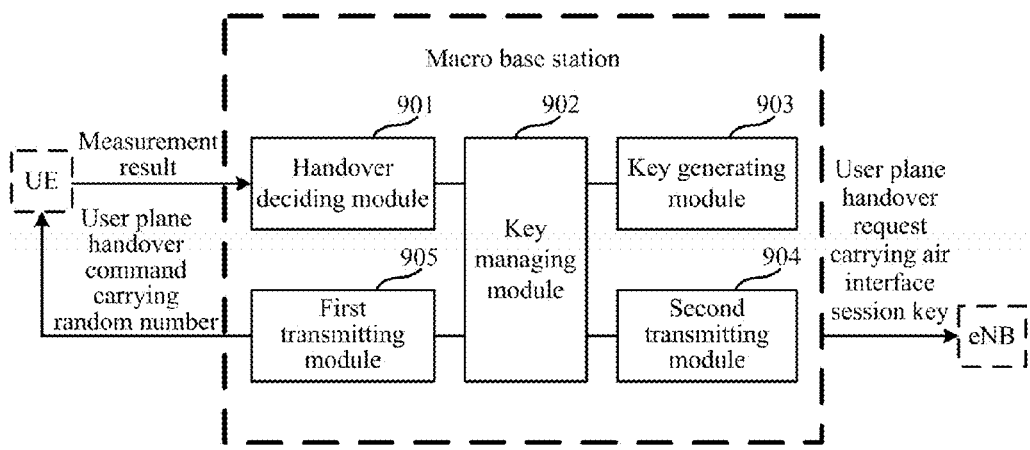
FIG. 9 illustrates a schematic structural diagram of a base station device according to an embodiment of the disclosure.

Referring to FIG. 9, there is illustrated a schematic structural diagram of a base station device according to an embodiment of the disclosure. The base station device according to an embodiment of the disclosure is a macro base station device.

As illustrated, the macro base station device can include a handover deciding module 901, a key managing module 902, a key generating module 903 and a first transmitting module 905 and can further include a second transmitting module 904.

The handover deciding module 901 is configured to make a user plane bearer handover decision on a UE.

The key managing module 902 is configured to transmit an instruction to the key generating module 903 to generate a key, and an instruction to the first transmitting module 905 to transmit a distinguishing parameter, when the handover deciding module 901 decides user plane bearers of the UE to be handed over.

The key generating module 903 is configured to generate the key for use in communication of a destination base station with the UE from the distinguishing parameter of the destination base station and a temporary key shared by the macro base station device with the UE in response to the instruction of the key managing module 902, where the distinguishing parameter is a random number generated by the macro base station or information capable of distinguishing uniquely the destination base station.

The first transmitting module 905 is configured to transmit the distinguishing parameter to the UE in response to the instruction of the key managing module 902 so that the UE generates the key for use in communication of the UE with the destination base station from the distinguishing parameter, and the temporary key shared by the UE with the macro base station.

According to an embodiment of the disclosure, if the handover deciding module 901 decides the user plane bearers of the UE to be handed over from a local base station to the macro base station, the destination base station can be the macro base station.

According to an embodiment of the disclosure, the destination base station can be a destination local base station.

According to an embodiment of the disclosure, if the handover deciding module 901 decides the user plane bearers of the UE to be handed over from the macro base station to the destination local base station or decides the user plane bearers of the UE to be handed over from a local base station where the UE is currently located to the destination local base station, then the key managing module 902 is further configured to transmit an instruction to the second transmitting module 904 to transmit the key. Accordingly the second transmitting module 904 is configured to transmit the key generated by the key generating module 903 to the destination local base station in response to the instruction of the key managing module.

According to an embodiment of the disclosure, if the handover deciding module 901 decides a part of the user plane bearers of the UE to be handed over from the macro base station to the destination local base station, then the key managing module 902 is further configured to instruct the key generating module 903 to generate the key for use in communication of the macro base station with the UE from the distinguishing parameter of the destination local base station and the temporary key shared by the macro base station with the UE. Alternatively if the handover deciding module 901 decides a part of the user plane bearers of the UE to be handed over from the macro base station to the destination local base station, then the key managing module 902 is further configured to instruct the key generating module 903 to generate the key for use in communication of the macro base station with the UE from the temporary key shared by the macro base station with the UE.

According to an embodiment of the disclosure, the handover deciding module 901 is further configured to make a control plane bearer decision. Accordingly if the handover deciding module 901 decides a part of control plane bearers of the UE to be handed over from the macro base station to the local destination base station, then the key managing module 902 is configured to instruct the key generating module 903 to generate an encryption key and an integrity protection key; or if the handover deciding module 901 decides the user plane bearers of the UE to be handed over from a local base station to the macro base station, and there are part of control plane bearers of the UE on the local base station before the handover, then the key managing module 902 is configured to instruct the key generating module 903 to generate an encryption key and an integrity protection key.

According to an embodiment of the disclosure, the second transmitting module 904 transmits the generated key to the destination local base station by carrying it in a user plane handover request message or a predefined message.

According to an embodiment of the disclosure, the first transmitting module 905 transmits the distinguishing parameter to the UE by carrying it in a user plane handover command.

The method and device according to the embodiments of the disclosure can be embodied in hardware or computer readable instructions or a combination of hardware and computer readable instructions. The computer readable instructions used in the embodiments can be stored by a number of processors into a readable storage medium, e.g., a hard disk, a CD-ROM, a DVD, an optical disk, a floppy disk, a magnetic tape, an RAM, an ROM or another appropriate storage device. Alternatively at least a part of the computer readable instructions can be replaced with particular hardware, e.g., a customized integrated circuitry, an array of gates, an FPGA, a PLD, a specifically-functioning computer, etc.

An embodiment of the disclosure provides a computer readable storage medium in which instructions are stored to cause a computer to perform the method described in this context. Particularly the respective systems or devices according to the embodiments of the disclosure are provided with a storage medium in which computer readable program codes are stored to perform the functions in any one of the embodiments above, and these systems or devices (or a CPU or an MPU) can fetch and execute the program codes stored in the storage medium.

In this case, the program codes fetched from the storage medium can be executed to perform any one of the embodiments above, so the program codes and the storage medium with the program codes stored thereon fall into the scope of the inventive solution.

The storage mediums to provide the program codes include a floppy disk, a hard disk, an optical-magnetic disk, an optical disk (e.g., a CD-ROM, a CD-R, a CD-RW, a DVD-ROM, a DVD-RAM, a DVD-RW, a DVD+RW, etc.), a magnetic disk, a flash memory card, an ROM, etc. Optionally the program codes can alternatively be downloaded from a server computer over a communication network.

It shall be noted that for the program codes executed by the computer, at least a part of the operations performed by the program codes can be performed by an operating system running on the computer to thereby implement the technical solution in any one of the embodiments above, where the computer executes instructions based upon the program codes.

Moreover the program codes in the storage medium are written into a memory arranged in an expansion board inside the computer, or into a memory arranged in an expansion unit connected with the computer. In this embodiment, a CPU in the expansion board or the expansion unit can be caused by the instructions based upon the program codes to perform at least a part of the operations to thereby implement the technical solution in any one of the embodiments above.

The foregoing disclosure is merely illustrative of the preferred embodiments of the disclosure, and it shall be noted that those ordinarily skilled in the art can further make several modifications and variations without departing from the spirit of the disclosure and these modifications and variations shall also fall into the scope of the disclosure as claimed.

The invention claimed is:

1. A key isolation method, comprising:
   generating, by a macro base station, a key for use in communication of a destination base station with a User Equipment, UE, from a distinguishing parameter of the destination base station and a temporary key shared by the macro base station with the UE, upon deciding user plane bearers of the UE to be handed over; and
   transmitting, by the macro base station, the distinguishing parameter to the UE so that the UE generates the key for use in communication of the UE with the destination base station from the distinguishing parameter, and the temporary key shared by the UE with the macro base station;
   wherein the destination base station is a destination local base station; and
   if the macro base station decides the user plane bearers of the UE to be handed over from the macro base station to the destination local base station or decides the user plane bearers of the UE to be handed over from a local base station where the UE is currently located to the destination local base station, then the method further comprises:
   transmitting the generated key to the destination local base station;
   wherein the macro base station has the entire user plane and control plane protocol stacks, and the local base station has the entire user plane protocol stack and a part of the Radio Resource Control (RRC) protocol function.

2. The method according to claim 1, wherein if the macro base station decides a part of the user plane bearers of the UE to be handed over from the macro base station to the destination local base station, then the method further comprises:
   generating, by the macro base station, the key for use in communication of the macro base station with the UE from the distinguishing parameter of the destination local base station and the temporary key shared by the macro base station with the UE so that the UE further communicates with the macro base station using the key generated by the UE; or
   generating, by the macro base station, the key for use in communication of the macro base station with the UE from the temporary key shared by the macro base station with the UE; and generating, by the UE, the key for use in communication of the UE with the macro base station from the temporary key shared by the UE with the macro base station.

3. The method according to claim 1, wherein if the macro base station further decides a part of control plane bearers of the UE to be handed over from the macro base station to the local destination base station, then the key generated by the macro base station comprises an encryption key and an integrity protection key.

4. The method according to claim 1, wherein the macro base station transmits the generated key to the destination local base station by carrying it in a user plane handover request message or a predefined message.

5. The method according to claim 1, wherein if the macro base station decides the user plane bearers of the UE to be handed over from a local base station to the macro base station, and there are part of control plane bearers of the UE on the local base station before the handover, then the macro base station hands over the part of control plane bearers of the UE to the macro base station and the key generated by the macro base station comprises an encryption key and an integrity protection key.

6. The method according to claim 1, wherein the macro base station transmits the distinguishing parameter to the UE by carrying it in a user plane handover command.

7. The method according to claim 1, wherein the distinguishing parameter is a random number generated by the macro base station or information capable of distinguishing uniquely the destination base station.

8. A macro base station device, comprising a handover deciding module, a key managing module, a key generating module and a first transmitting module, wherein:
the handover deciding module is configured to make a user plane bearer handover decision on a UE;
the key managing module is configured to transmit an instruction to the key generating module to generate a key, and an instruction to the first transmitting module to transmit a distinguishing parameter, when the handover deciding module decides user plane bearers of the UE to be handed over;
the key generating module is configured to generate the key for use in communication of a destination base station with the UE from the distinguishing parameter of the destination base station and a temporary key shared by the macro base station device with the UE in response to the instruction of the key managing module; and
the first transmitting module is configured to transmit the distinguishing parameter to the UE in response to the instruction of the key managing module so that the UE generates the key for use in communication of the UE with the destination base station from the distinguishing parameter, and the temporary key shared by the UE with the macro base station device;
wherein the destination base station is a destination local base station; and
if the handover deciding module decides the user plane bearers of the UE to be handed over from the macro base station device to the destination local base station, or if the handover deciding module decides the user plane bearers of the UE to be handed over from a local base station where the UE is currently located to the destination local base station, then the macro base station device further comprises a second transmitting module,
the key managing module is further configured to transmit an instruction to the second transmitting module to transmit the key, and
the second transmitting module is configured to transmit the key generated by the key generating module to the destination local base station in response to the instruction of the key managing module;
wherein the macro base station has the entire user plane and control plane protocol stacks, and the local base station has the entire user plane protocol stack and a part of the Radio Resource Control (RRC) protocol function.

9. The device according to claim 8, wherein if the handover deciding module decides a part of the user plane bearers of the UE to be handed over from the macro base station device to the destination local base station, then the key managing module is further configured to instruct the key generating module to generate the key for use in communication of the macro base station device with the UE from the distinguishing parameter of the destination local base station and the temporary key shared by the macro base station device with the UE; or
if the handover deciding module decides a part of the user plane bearers of the UE to be handed over from the macro base station device to the destination local base station, then the key managing module is further configured to instruct the key generating module to generate the key for use in communication of the macro base station device with the UE from the temporary key shared by the macro base station device with the UE.

10. The device according to claim 8, wherein the handover deciding module is further configured to make a control plane bearer decision; and
if the handover deciding module decides a part of control plane bearers of the UE to be handed over from the macro base station device to the local destination base station, then the key managing module is configured to instruct the key generating module to generate an encryption key and an integrity protection key.

11. The device according to claim 8, wherein the handover deciding module is further configured to make a control plane bearer decision; and
if the handover deciding module decides the user plane bearers of the UE to be handed over from a local base station to the macro base station device, and there are part of control plane bearers of the UE on the local base station before the handover, then the key managing module is configured to instruct the key generating module to generate an encryption key and an integrity protection key.

12. The device according to claim 8, wherein the second transmitting module is configured to transmit the generated key to the destination local base station by carrying it in a user plane handover request message or a predefined message.

13. The device according to claim 8, wherein the first transmitting module is configured to transmit the distinguishing parameter to the UE by carrying it in a user plane handover command.

14. The device according to claim 8, wherein the distinguishing parameter is a random number generated by the macro base station device or information capable of distinguishing uniquely the destination base station.

* * * * *